United States Patent [19]

Pitts

[11] Patent Number: 4,894,166

[45] Date of Patent: Jan. 16, 1990

[54] METHOD FOR CLEANING OIL-CONTAMINATED WATER IN A SWIMMING OR BATHING AREA

[75] Inventor: Robert L. Pitts, Fremont, Ohio

[73] Assignee: Packaging Industries Group, Inc., Hyannis, Mass.

[21] Appl. No.: 237,628

[22] Filed: Aug. 28, 1988

Related U.S. Application Data

[63] Continuation of Ser. No. 947,820, Dec. 30, 1986, abandoned.

[51] Int. Cl.$^4$ .................................................. C02F 1/28
[52] U.S. Cl. ..................................... 210/663; 210/693; 210/776; 210/169
[58] Field of Search ............ 210/671, 680, 693, 242.3, 210/242.4, 923, 924, 663, 169, 776

[56] References Cited

U.S. PATENT DOCUMENTS

| | | | |
|---|---|---|---|
| 3,147,216 | 9/1964 | Oemler | 210/693 |
| 3,681,237 | 8/1972 | Orban | 210/671 |
| 3,976,570 | 8/1976 | McCray | 210/693 |
| 4,406,793 | 9/1983 | Kruyer | 210/693 |

*Primary Examiner*—Ivars Cintins
*Attorney, Agent, or Firm*—Berman, Aisenberg & Platt

[57] ABSTRACT

A method for cleaning oil-contaminated water in a bathing or swimming area comprising circulating absorbers of open-cell cross-linked polyolefin foam on the surface of said oil-contaminated water, the contaminating oil being removed by said absorbers.

9 Claims, No Drawings

METHOD FOR CLEANING OIL-CONTAMINATED WATER IN A SWIMMING OR BATHING AREA

RELATED APPLICATIONS

This is a continuation of application Ser. No. 06/947,820, filed Dec. 30, 1986, now abandoned.

FIELD OF THE INVENTION

This invention relates to decontaminating water in bathing or swimming areas.

BACKGROUND OF THE INVENTION

Known methods of cleaning water in swimming pools and other bathing or swimming areas include use of skimmers and filters. Such methods do not address the problem of oil contamination, but merely serve to collect debris.

DeBeuckelaer, U.S. Pat. No. 4,279,757 describes a method for absorbing hydrophobic organic liquids from water by passing the combined liquids through a column-like vessel filled with a hydrophobic, open cell polyurethane foam. De Young, U.S. Pat. No. 3,888,766 shows open cell polyurethane or polyethylene foam impregnated with a hydrophobic, oleophilic sealant to be useful as an oil absorbent. Jarre, U.S. Pat. No. 4,237,237 describes hydrophobic polyurethane foams for absorbing oils.

SUMMARY OF THE INVENTION

The invention provides a method for cleaning oil-contaminated water in a bathing or swimming area by circulating freely movable open-cell polymer foam oil-absorbers, preferably foam balls, on the surface of the oil-contaminated water to absorb the oil. Oil floating on the water, such as sun-tan oil washed off the bodies of bathers, is absorbed by the foam balls which rotate freely in the water.

It is the object of the invention to provide a method for cleaning oil-contaminated water in a bathing or swimming area.

DESCRIPTION OF THE INVENTION

Foam oil absorbers of the invention are circulated either in a skimming device or freely, on the surface of a body of water used for bathing or swimming, absorbing oil contaminating the water surface. Swimming or bathing areas, such as lakes, ponds, swimming pools or spas, tend to become contaminated with oil, such as sun-tan oil, which washes off the bodies of bathers. Oil may build up in the water and become offensive if not removed.

The preferred material for use as an oil absorber of the invention is that produced according to the method described in U.S. Pat. No. 4,435,346, the specification of which is incorporated herein by reference. The method described, for the production of an open-cell foamed article of cross-linked polyolefin, comprises blending the polyolefin with a decomposing-type chemical blowing agent and a cross-linking agent to obtain a foamable and cross-linkable composition. The composition is formed into a desired shape, maintaining its gel percent at zero. The shaped composition is heated at a suitable foaming temperature under atmospheric pressure in such conditions that the peak of the ratio of the degree of cross-linking to the degree of decomposition of the blowing agent is not more than 20 to decompose the cross-linking agent and the blowing agent concurrently, thereby giving rise to a foamed product of cross-linked polyolefin having cells enclosed with very thin membranes capable of being easily ruptured by the action of mechanical force. The foamed product is mechanically deformed, for example, by compressing it by passing between two rolls rotated at an equal speed, with a result that the compression applied ruptures the membranes of closed cells of the foamed article and consequently converts the closed cell structure to an open cell structure. Polyolefins preferably used in the invention are described in U.S. Pat. No. 4,435,346, and include low-, medium- and high-density polyethylene, ethylenepropylene copolymer, polypropylene, etc. Examples of suitable cross-linking agents, blowing agents, reaction temperatures and other process parameters are found in the specification of U.S. Pat. No. 4,435,346.

U.S. Pat. No. 4,435,346 suggests use of this material for cushioning media, filters, heat insulating materials, coaters, etc., but there is no suggestion of using articles of this composition for cleaning oil-contaminated water in a swimming or bathing area.

The foam absorber of the invention removes the oily film which forms a scum on the water, generally composed of body oil, suntan lotions, and/or perfumed skin softening oils which are often added to spas. These oils would otherwise clog and impede the filtration action of most spa and swimming pool filters, reducing filter life and efficiency. The preferred material for the oil absorber is such that it draws oil to it, by an action known as "molecular wicking". An oil absorber of the invention may absorb about forty or more times its own weight in oil.

In a preferred use, one or more foam absorbers are placed in a skimmer used in any enclosed body of water used for swimming or bathing, such as a pond, pool or spa, and the absorbers immediately begin to bob and roll as the water passes through the skimmer. In another use, one or more absorbers move freely on the water surface, directed by the wind, and may be scooped up by a net, or by other means, after circulating on the water surface. The absorbers attract and absorb oil until they are saturated, a saturated absorber sitting much lower in the water than a clean one. When an absorber has become saturated, it can be removed from the water, the oil squeezed out, and the absorber reused.

For cleaning oil contaminated water in for example, a spa or a swimming area, the oil absorbing material is preferably formed into balls of about 2 to 10 centimeters in diameter which rotate freely on the water. Other rotatable shapes, typically having a curved outer surface, are also appropriate, for example, cylindrical or ovoid oil absorbers are useful.

While the invention has been described above with respect to certain embodiments thereof, it will be appreciated that variations and modifications may be made without departing from the spirit and scope of the invention.

What is claimed is:

1. A method for cleaning oil-contaminated water in a closed recirculating swimming or bathing system which includes a skimmer device comprising:

circulating at least one oil absorber comprising compressible, oleophilic, hydrophobic crosslinked polyolefin foam on a surface of said oil-contaminated water, said at least one absorber having a compressible curved outer surface, and skimming oil contaminants from the surface of the water, whereby said at least one absorber removes oil from the surface of said water.

2. A method of claim 1 wherein the absorber is a foam ball.

3. A method of claim 1 wherein the absorber is open-cell cross-linked foam.

4. A method of claim 3 wherein the absorber is a foam ball.

5. A method of claim 3 wherein the foam comprises polyethylene foam.

6. A method of claim 3 wherein the foam comprises polypropylene foam.

7. A method of claim 1 wherein the foam comprises polyethylene absorber.

8. A method of claim 1 wherein the foam comprises polypropylene absorber.

9. A method of claim 1 wherein the at least one absorber is placed in a skimmer.

* * * * *